(12) United States Patent
Chien

(10) Patent No.: US 8,082,627 B2
(45) Date of Patent: Dec. 27, 2011

(54) HINGE AND AN ELECTRONIC DEVICE WITH THE SAME

(75) Inventor: Hsiang-Chi Chien, Shulin (TW)

(73) Assignee: Shin Zu Shing Co., Ltd., Shulin, Taipei Hsien (TW)

( * ) Notice: Subject to any disclaimer, the term of this patent is extended or adjusted under 35 U.S.C. 154(b) by 327 days.

(21) Appl. No.: 12/585,102

(22) Filed: Sep. 3, 2009

(65) Prior Publication Data
US 2011/0047748 A1    Mar. 3, 2011

(51) Int. Cl.
*E05D 11/08* (2006.01)

(52) U.S. Cl. .......................... 16/342; 16/341

(58) Field of Classification Search .......... 16/337, 16/342, 335, 334, 341, 344; 361/679.08, 361/679.11, 679.02, 679.15, 679.27; 455/90.3, 455/575.1, 575.3, 575.8; 379/433.12, 433.13; 348/373, 333.01, 333.06, 794
See application file for complete search history.

(56) References Cited

U.S. PATENT DOCUMENTS

| | | | | |
|---|---|---|---|---|
| 4,785,500 A * | 11/1988 | Langridge | ........ | 16/297 |
| 5,018,244 A * | 5/1991 | Hino | ........ | 16/342 |
| 5,109,573 A * | 5/1992 | Sherman | ........ | 16/341 |
| 5,765,263 A * | 6/1998 | Bolinas et al. | ........ | 16/342 |
| 6,481,056 B1 * | 11/2002 | Jesse | ........ | 16/334 |
| 6,609,273 B1 * | 8/2003 | Yamada et al. | ........ | 16/332 |
| 7,096,534 B2 * | 8/2006 | Wang et al. | ........ | 16/284 |
| 2002/0112319 A1 * | 8/2002 | Kida | ........ | 16/342 |
| 2005/0204509 A1 * | 9/2005 | Lin et al. | ........ | 16/342 |
| 2006/0272129 A1 * | 12/2006 | Rude et al. | ........ | 16/342 |
| 2007/0199180 A1 * | 8/2007 | Chen et al. | ........ | 16/342 |
| 2007/0214605 A1 * | 9/2007 | Tu | ........ | 16/342 |
| 2009/0089976 A1 * | 4/2009 | Wang et al. | ........ | 16/321 |

FOREIGN PATENT DOCUMENTS

DE    4335962 A1 *    4/1995

* cited by examiner

*Primary Examiner* — Chuck Y. Mah
(74) *Attorney, Agent, or Firm* — Bacon & Thomas, PLLC

(57) ABSTRACT

A hinge is mounted in an electronic device with a cover and a base. The hinge has a first pivoting assembly, a second pivoting assembly and a resilient unit. The first pivoting assembly has a resilient plug. The resilient plug is mounted between the second pivoting assembly and the resilient unit to provide friction and to keep the second pivoting assembly from departing from the first pivoting assembly. The friction is adjusted by changing the resilience of the resilient plug or the resilient unit, or by changing the thickness of the resilient plug. Therefore, preciseness of the size of other component is less required to reduce the manufacturing cost.

12 Claims, 19 Drawing Sheets

HINGE AND AN ELECTRONIC DEVICE WITH THE SAME

BACKGROUND OF THE INVENTION

1. Field of the Invention

The present invention relates to a hinge, especially to a hinge for an electronic device having adjustable friction and anti-departing function.

2. Description of the Prior Arts

Hinges are mounted between a cover and a base of an electronic device to provide pivoting. When the cover is pivoted, the hinge provides friction to hold the cover at any desired visual angle.

A conventional hinge comprises a first segment and a second segment. The first segment has a sleeve and is connected to the cover of the electronic device. The second segment has a pair of resilient arms and is connected to the base of the electronic device. The resilient arms are inserted into the sleeve, urge and rub against the sleeve. When the cover is pivoted, the sleeve is rotated relative to the resilient arms to provide friction.

However, the friction is determined by the size of the resilient arms. Therefore, the resilient arms and the sleeve should be precisely made to provide adequate friction so that the conventional hinge is cost high and is not easy to adjust the friction.

To overcome the shortcomings, the present invention provides a hinge to mitigate or obviate the aforementioned problems.

SUMMARY OF THE INVENTION

The main objective of the present invention is to provide a hinge that has adjustable friction and anti-departing function. The hinge is mounted in an electronic device with a cover and a base. The hinge has a first pivoting assembly, a second pivoting assembly and a resilient unit. The first pivoting assembly has a resilient plug. The resilient plug is mounted between the second pivoting assembly and the resilient unit to provide friction and to keep the second pivoting assembly from departing from the first pivoting assembly. The friction is adjusted by changing the resilience of the resilient plug or the resilient unit, or by changing the thickness of the resilient plug. Therefore, less preciseness in the size of other component is required, so reducing manufacturing costs.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
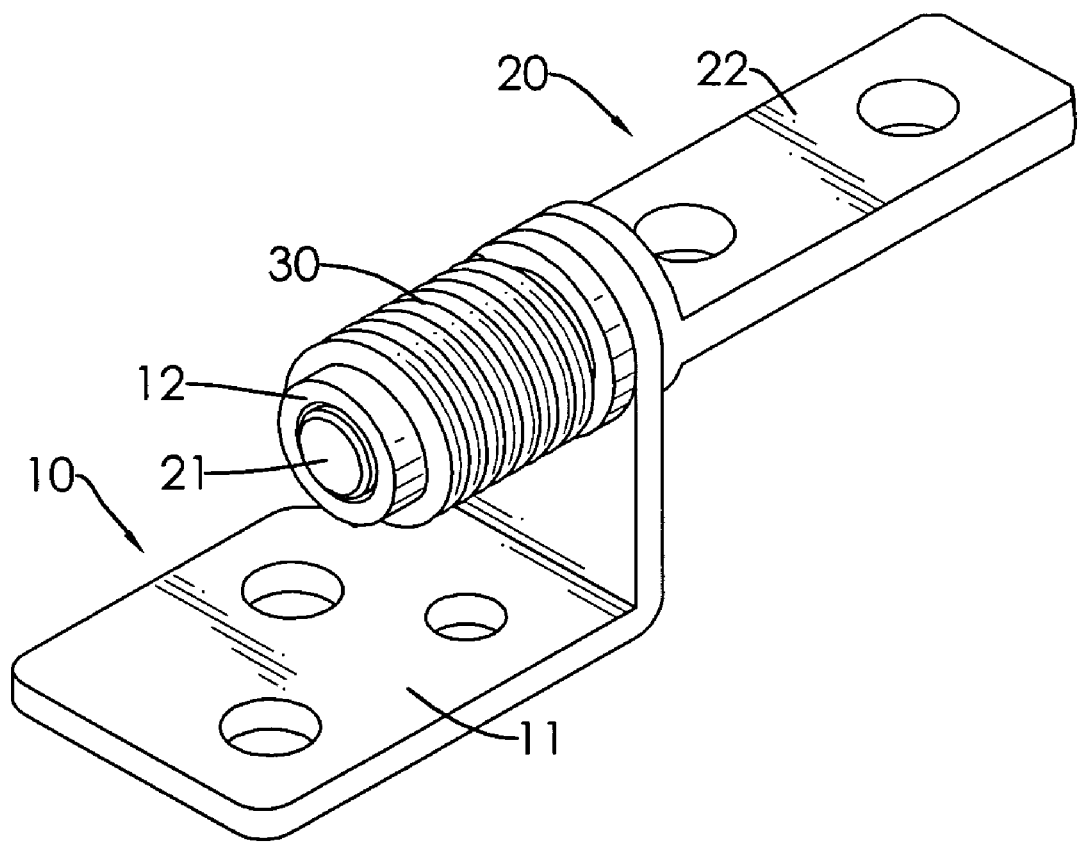
FIG. 1 is a perspective view of a first embodiment of a hinge in accordance with the present invention.
Figure 2:
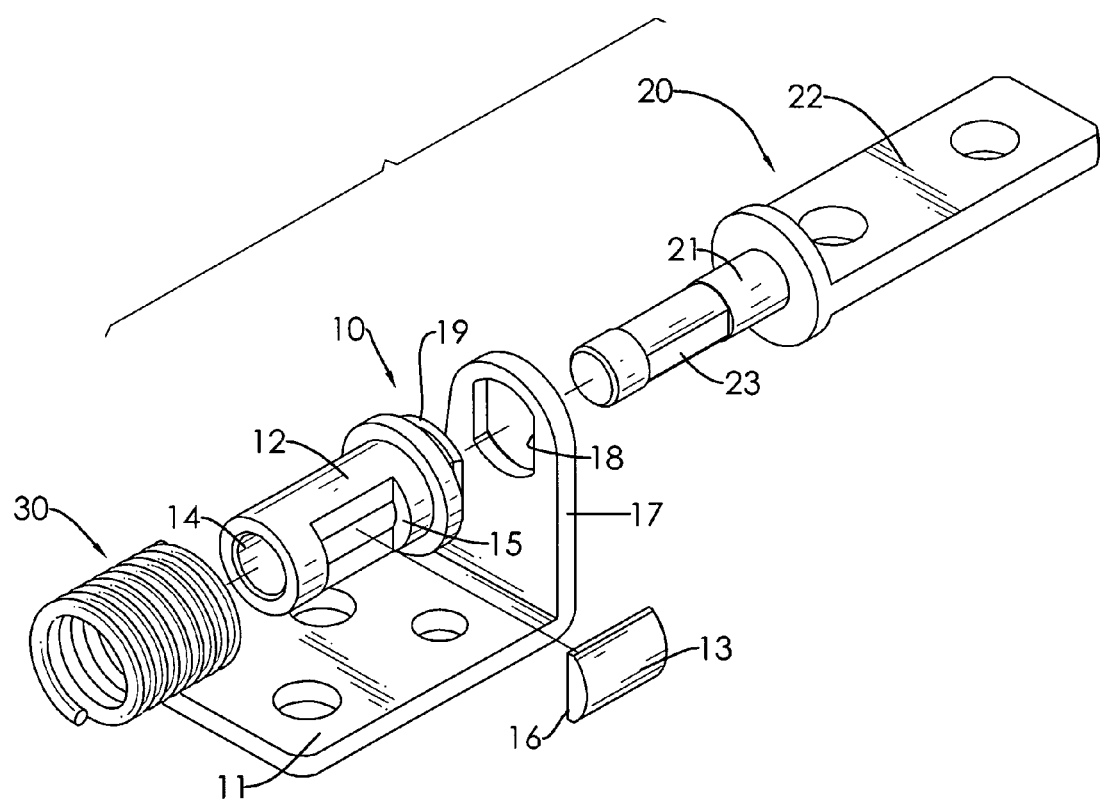
FIG. 2 is an exploded perspective view of the hinge in FIG. 1.
Figure 3:
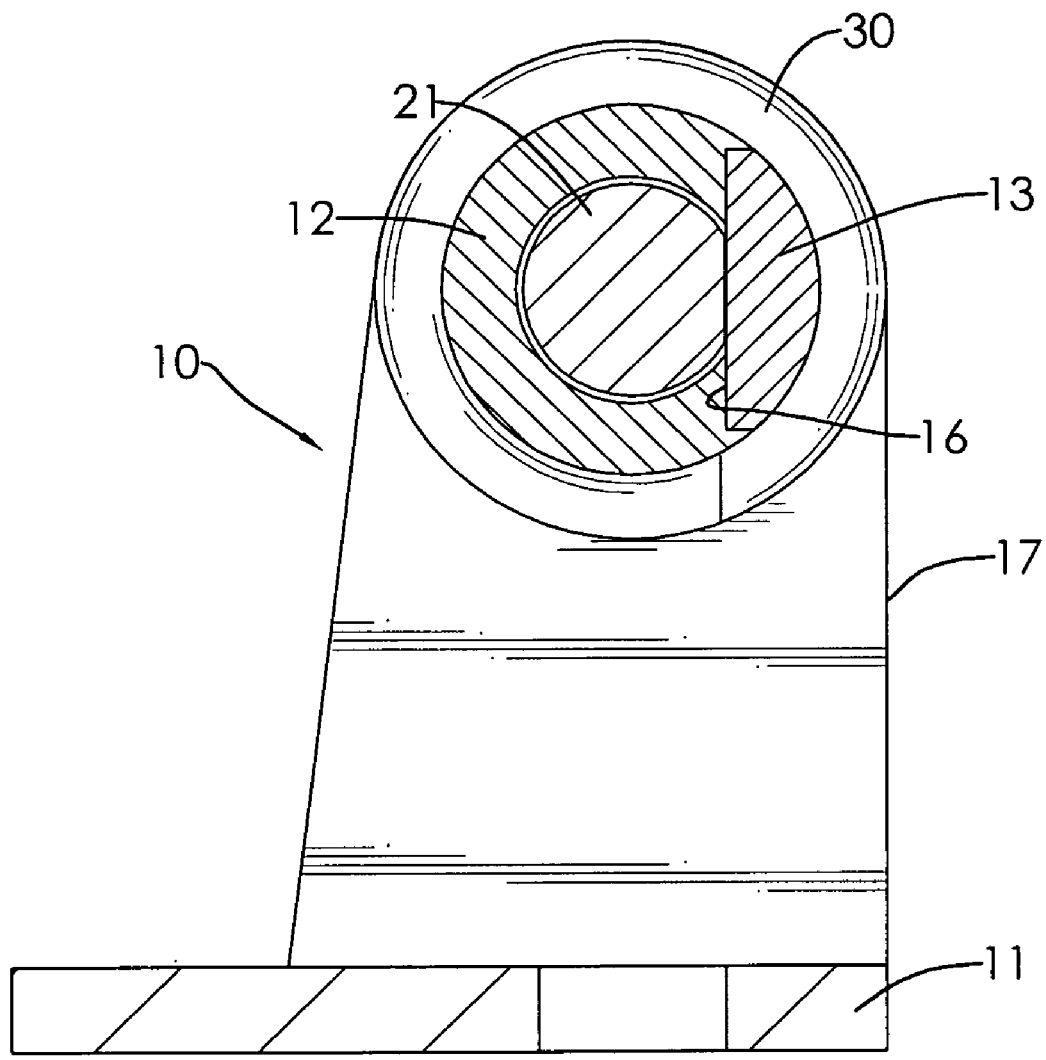
FIG. 3 is an end view in partial section of the hinge in FIG. 1.
Figure 4:
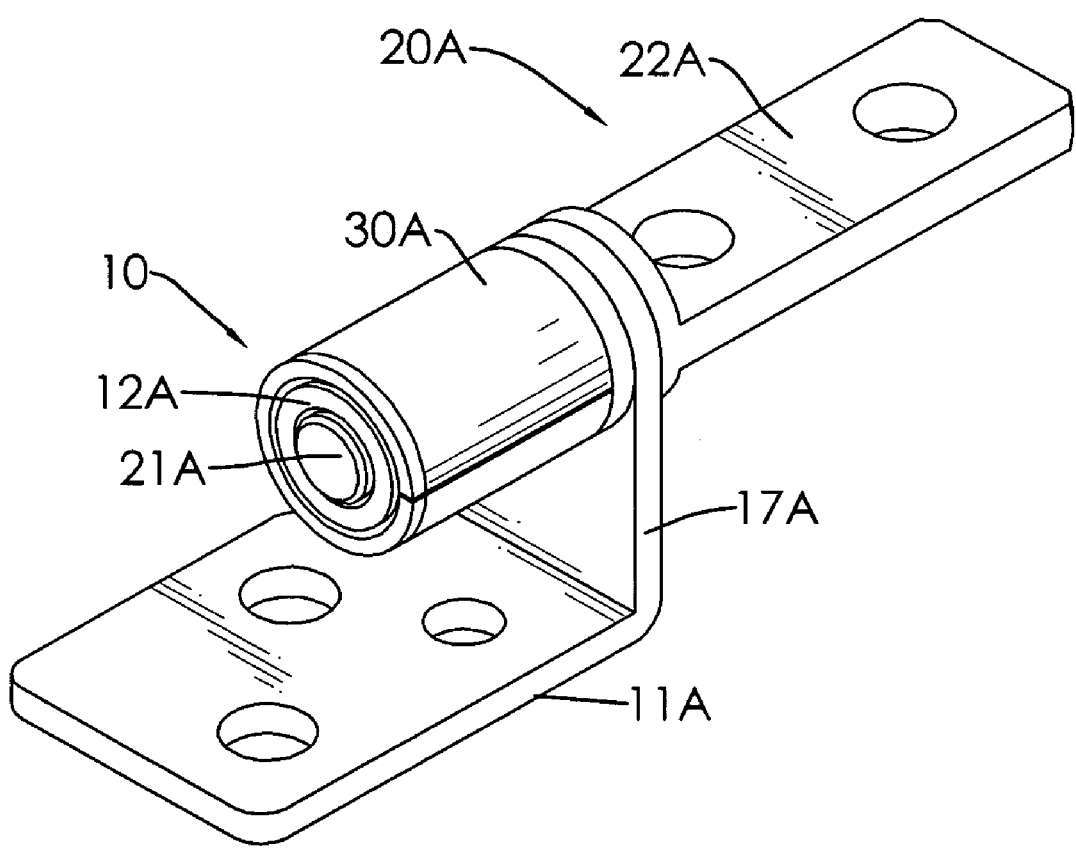
FIG. 4 is a perspective view of a second embodiment of a hinge in accordance with the present invention.

With reference to FIGS. 1 to 3, a hinge in accordance with the present invention comprises a first pivoting assembly (10), a second pivoting assembly (20) and a resilient unit (30).

The first pivoting assembly (10) comprises a connecting bracket (11), a sleeve (12) and a resilient plug (13). The sleeve (12) is connected to the connecting bracket (11) and has a longitudinal cavity (14) and a mounting recess (15). The longitudinal cavity (14) may be formed through the sleeve (12). The mounting recess (15) is formed in a sidewall of the sleeve (12) and communicates with the longitudinal cavity (14). The resilient plug (13) is mounted tightly in the mounting recess (15) and has a positioning surface (16) exposed to the longitudinal cavity (14).

The second pivoting assembly (20) is connected to the sleeve (12) and has a pintle (21) and a mounting bracket (22). The pintle (21) is mounted in the longitudinal cavity (14) of the sleeve (12) and has a positioning section (23). The positioning section (23) is formed on a sidewall of the pintle (21) and abuts and wedges the positioning surface (16) of the resilient plug (13). The mounting bracket (22) is connected to an end of the pintle (21).

The resilient unit (30) is mounted around the sleeve (12) and holds the resilient plug (13).

With reference to FIGS. 7 to 9 and 10 to 12, in some preferred embodiments, the sleeve (12B, 12C) is formed integrally with the connecting bracket (11B, 11C).

With reference to FIGS. 1 to 3, 4 to 6 and 16 to 18, in some embodiments, the connecting bracket (11, 11A, 11E) has a side wing (17, 17A, 17E) with a mounting hole (18, 18A, 18E) formed therethrough. The sleeve (12, 12A, 12E) has a protrusion (19, 19A, 19E) mounted securely through the mounting hole (18, 18A, 18E).

Figure 13:
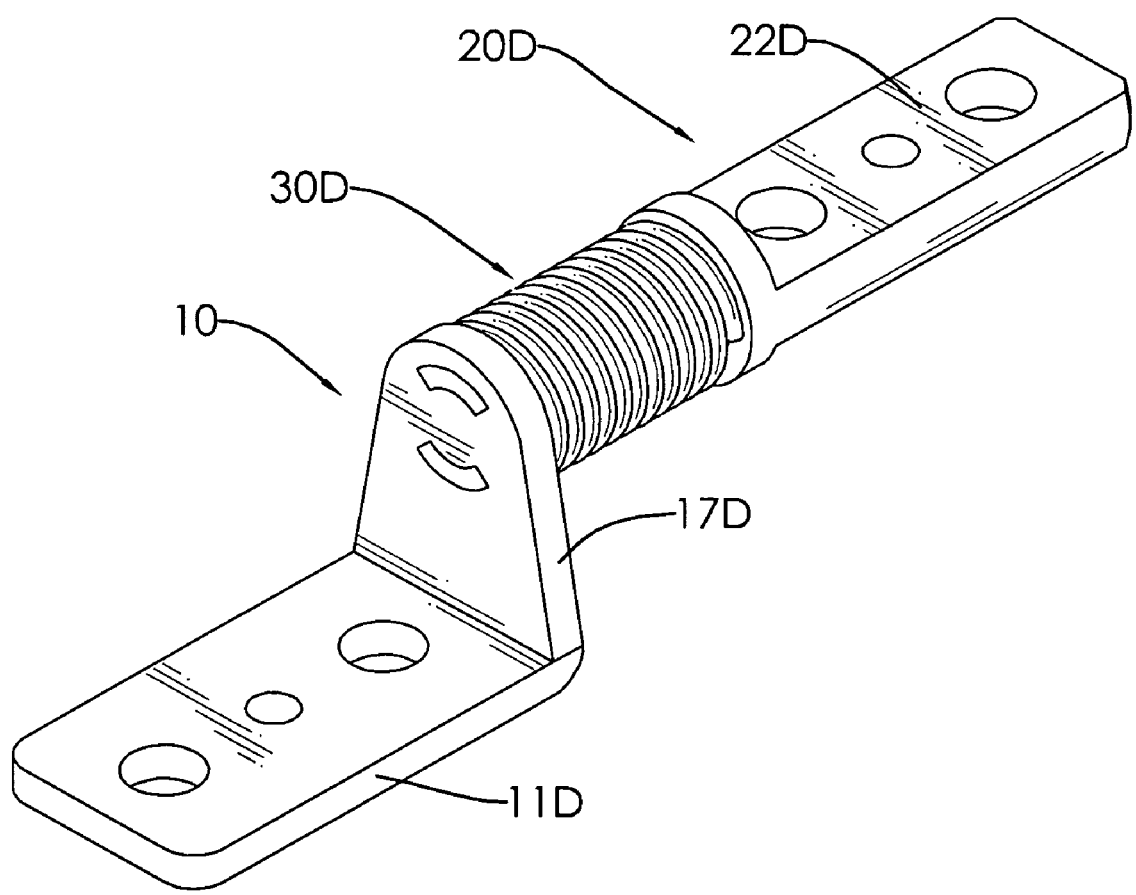
FIG. 13 is a perspective view of a fifth embodiment of a hinge in accordance with the present invention.
Figure 14:
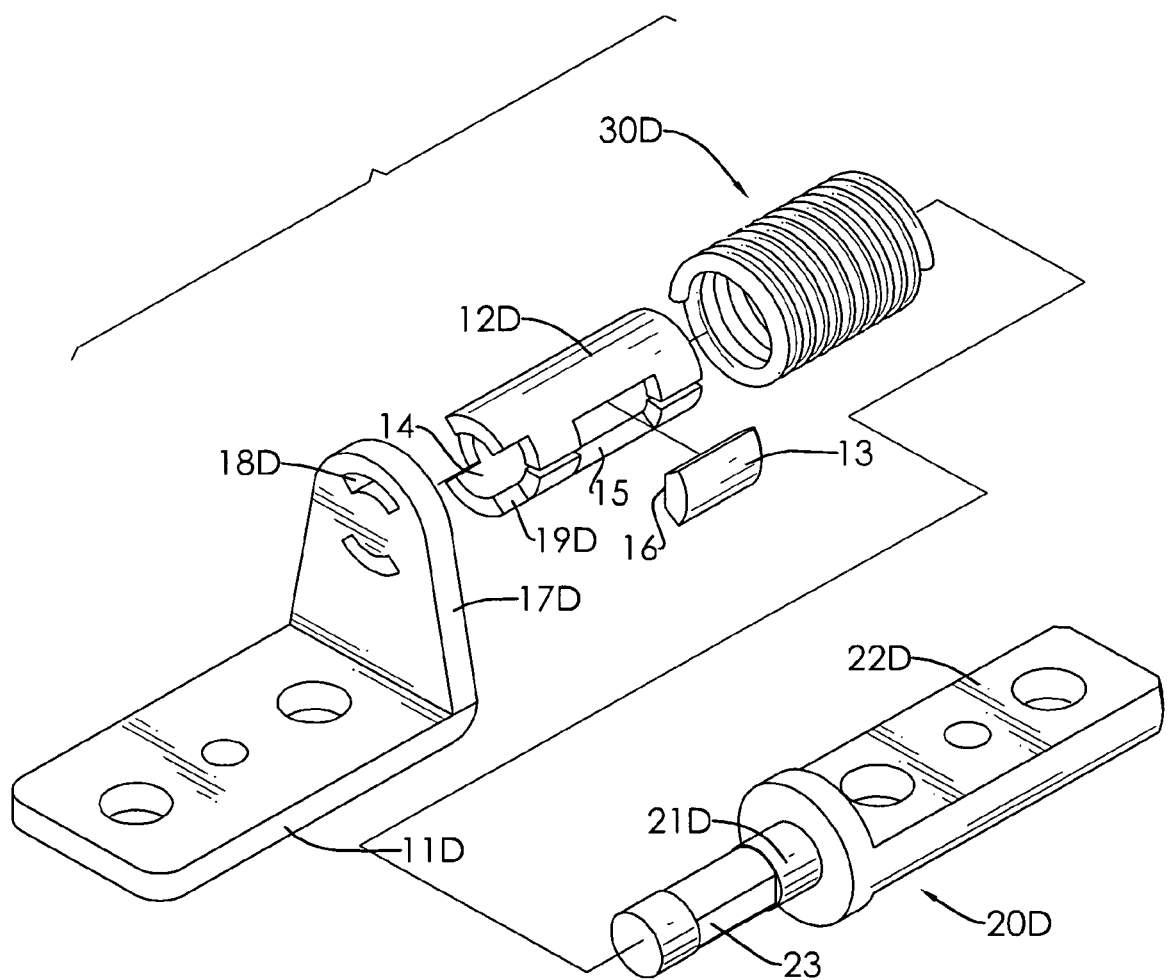
FIG. 14 is an exploded perspective view of the hinge in FIG. 13.
Figure 15:
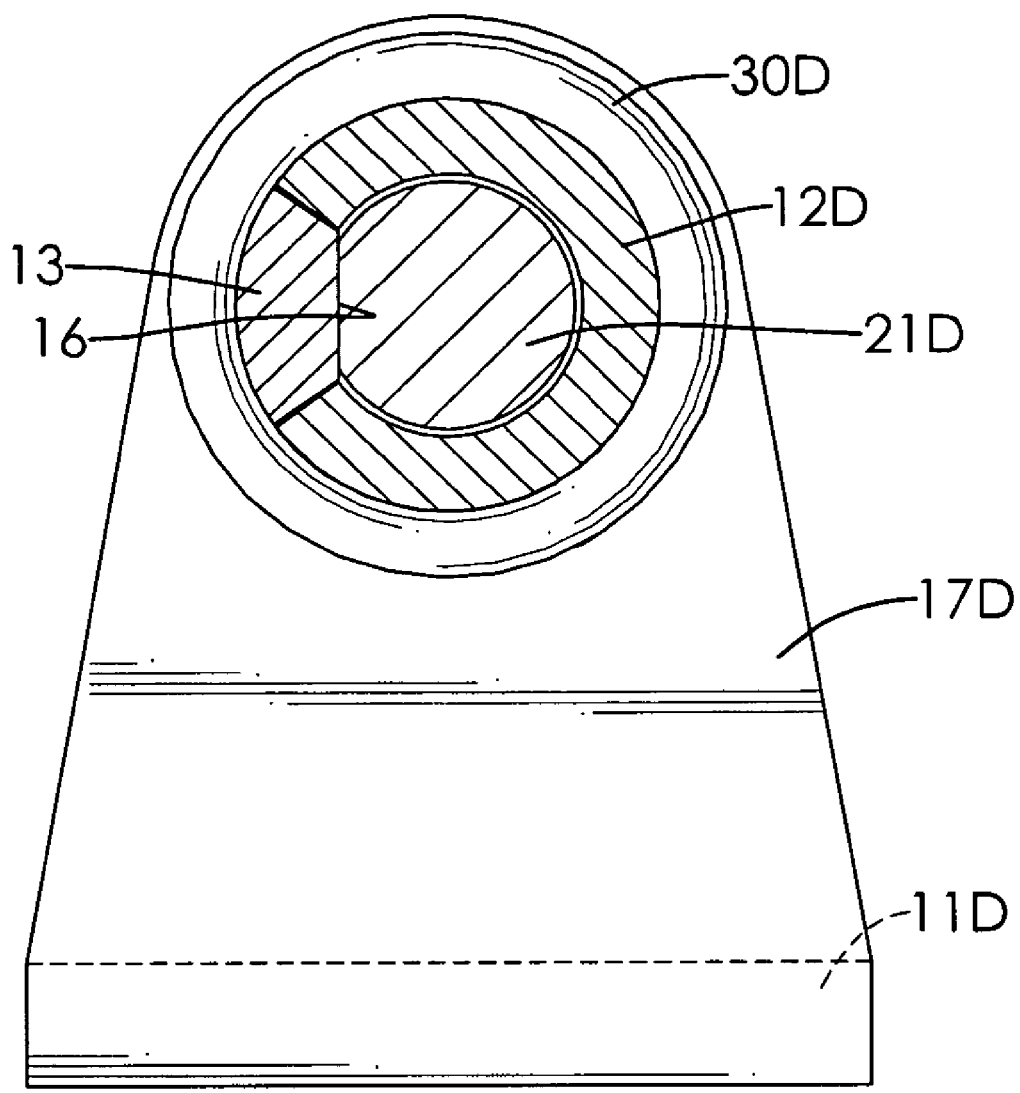
FIG. 15 is an end view in partial section of the hinge in FIG. 13.
Figure 16:
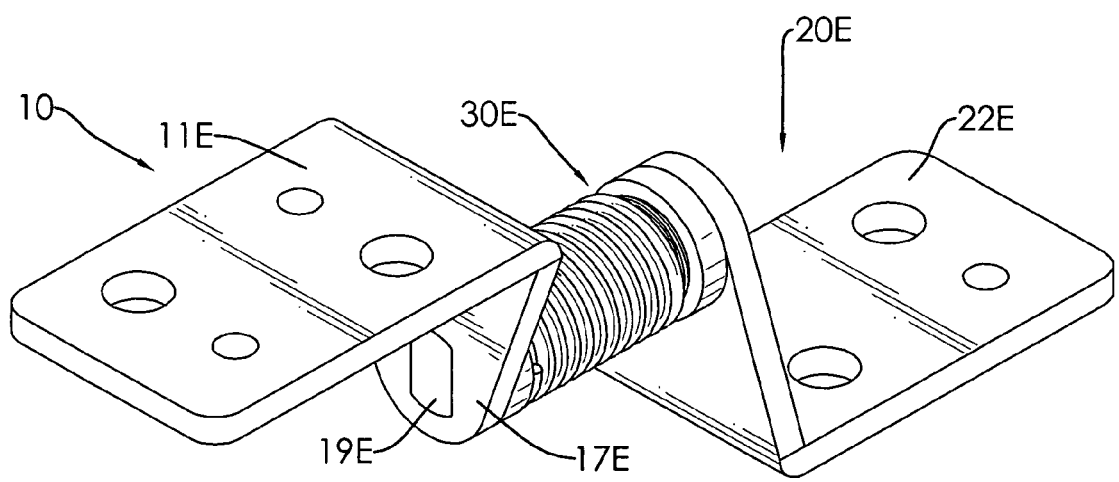
FIG. 16 is a perspective view of a sixth embodiment of a hinge in accordance with the present invention.

With further reference to FIGS. 13 to 15, the side wing (17D) may have two mounting holes (18D). The sleeve (12D)

may have two protrusions (19D) mounted securely through the mounting holes (18D).

With reference to FIGS. 2, 5, 8, 11 and 14, in some preferred embodiments, the pintle (21, 21A, 21B, 21C, 21D) is formed integrally with the mounting bracket (22, 22A, 22B, 22C, 22D).

Figure 17:
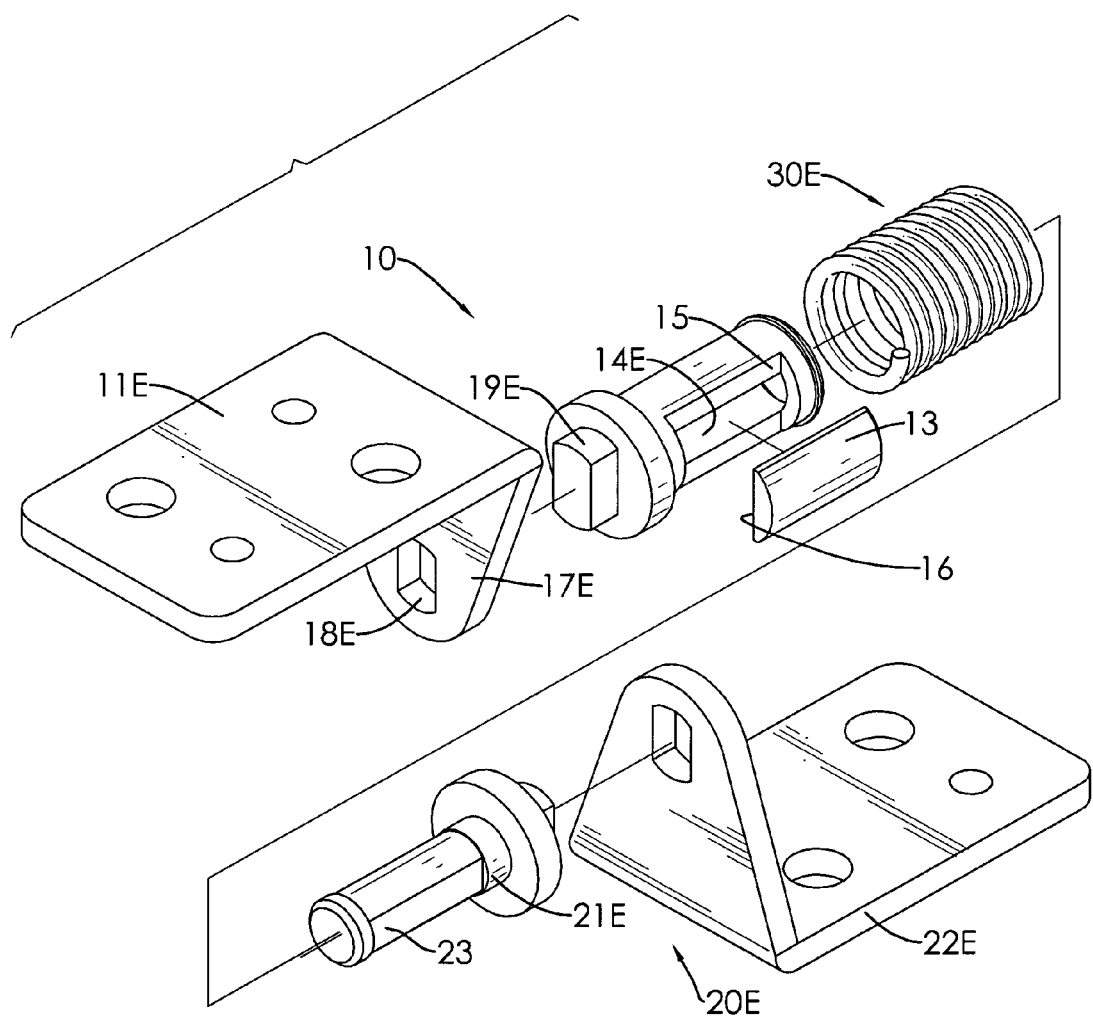
FIG. 17 is an exploded perspective view of the hinge in FIG. 16.
Figure 18:
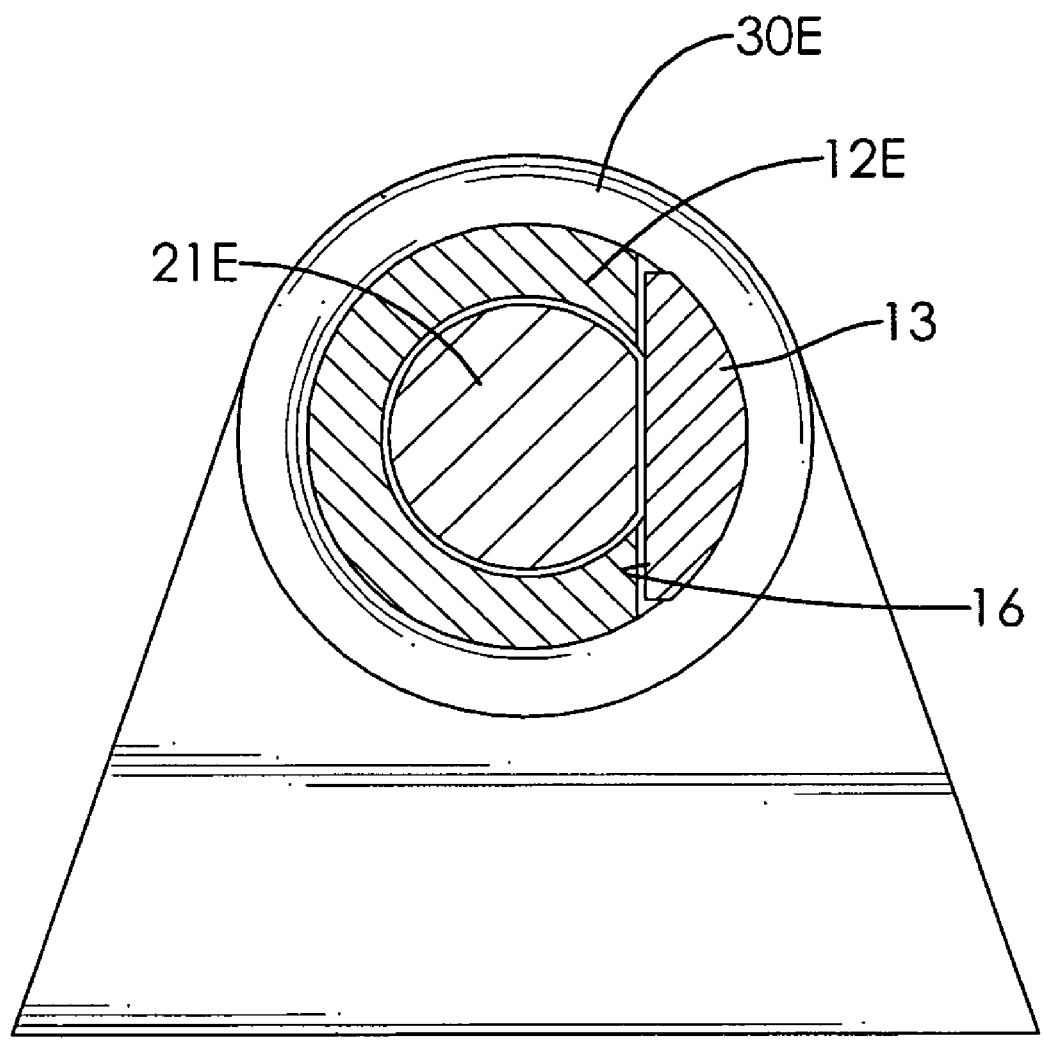
FIG. 18 is an end view in partial section of the hinge in FIG. 16.

With reference to FIG. 17, in a preferred embodiment, the mounting bracket (22E) is L-shaped and the pintle (21E) is mounted securely through the mounting bracket (22E).

With reference to FIGS. 2, 11, 14 and 17, in some preferred embodiments, the resilient unit (30, 30C, 30D, 30E) is a spring.

Figure 5:
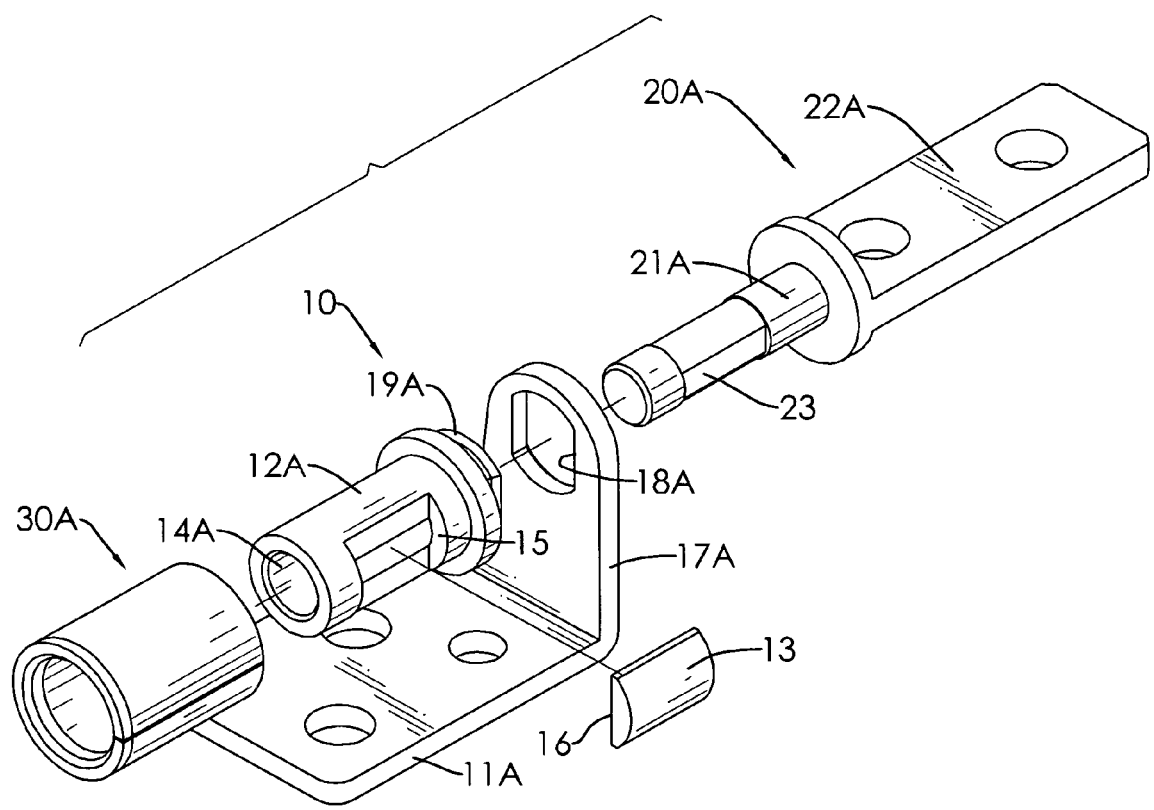
FIG. 5 is an exploded perspective view of the hinge in FIG. 4.
Figure 6:
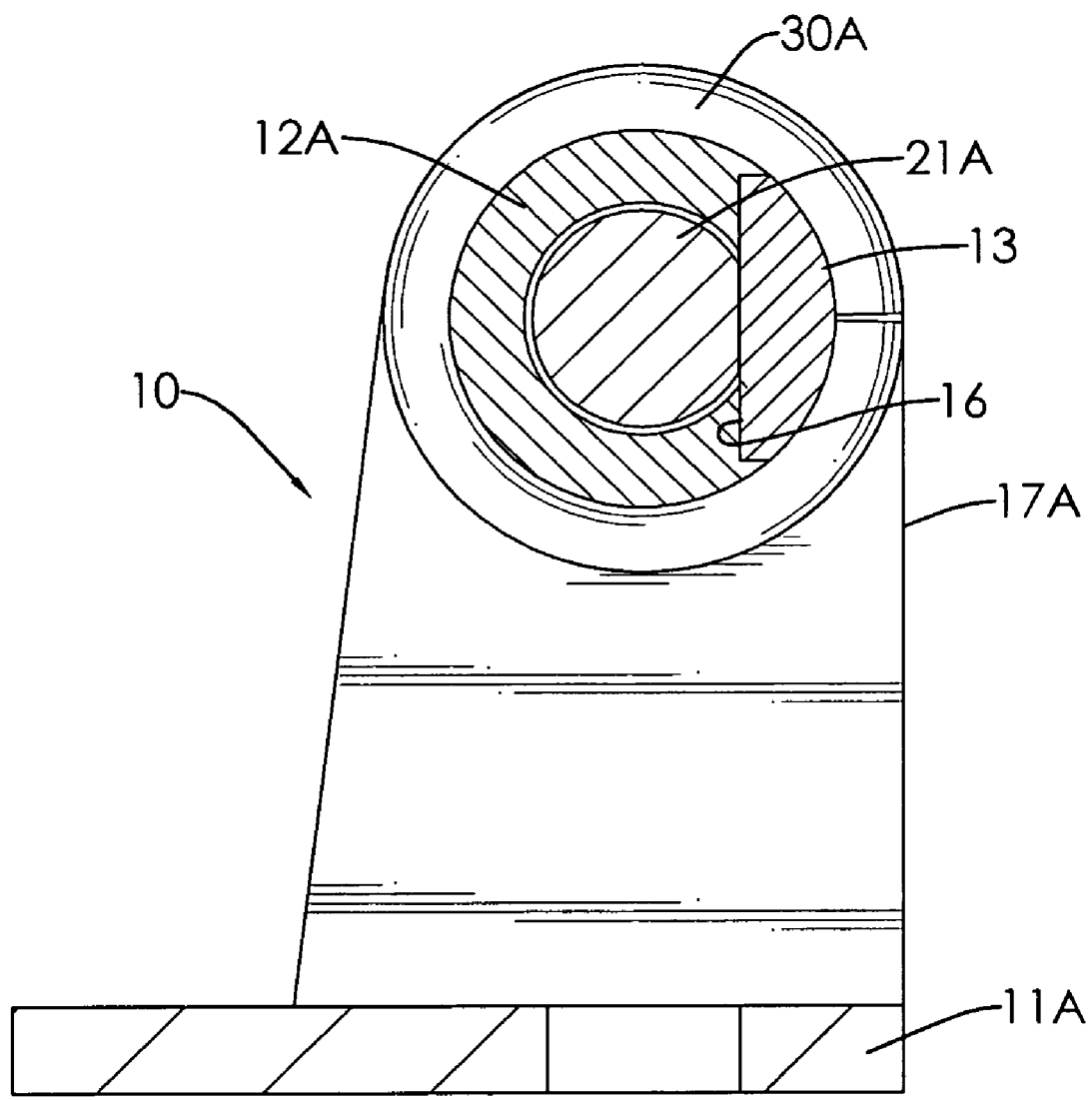
FIG. 6 is an end view in partial section of the hinge in FIG. 4.
Figure 7:
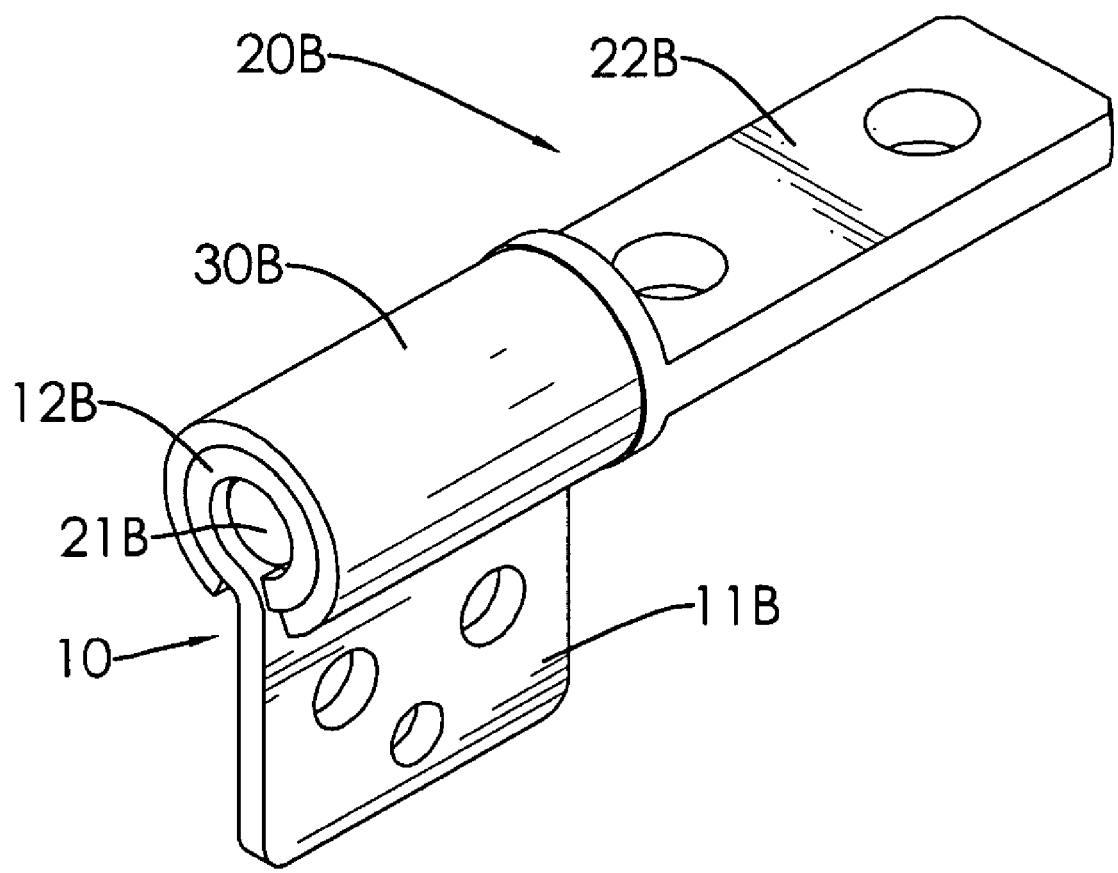
FIG. 7 is a perspective view of a third embodiment of a hinge in accordance with the present invention.
Figure 8:
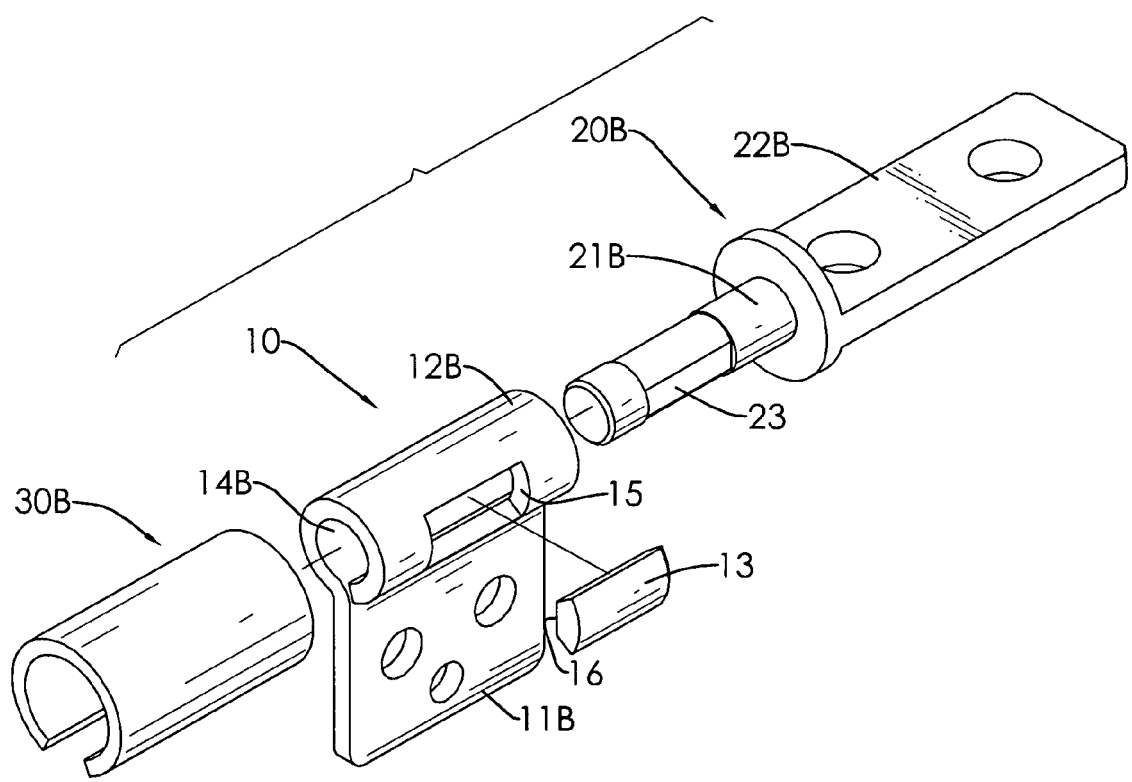
FIG. 8 is an exploded perspective view of the hinge in FIG. 7.
Figure 9:
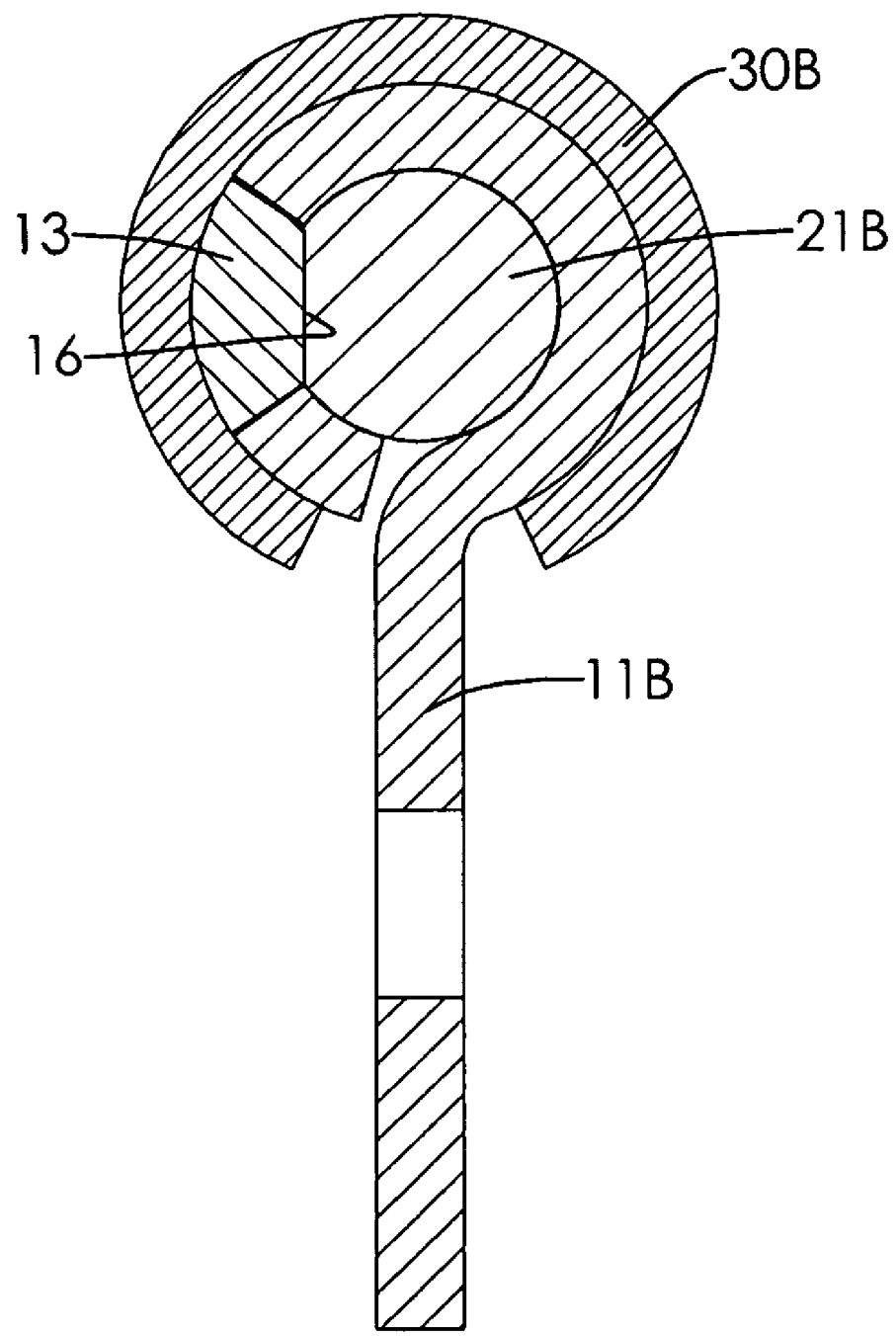
FIG. 9 is an end view in partial section of the hinge in FIG. 7.
Figure 10:
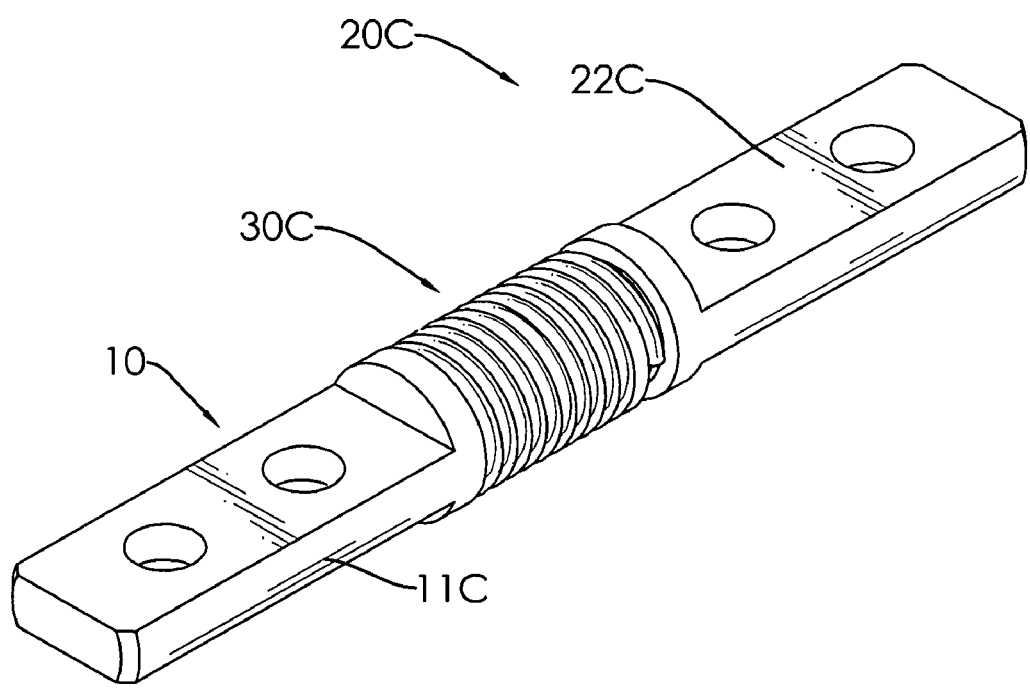
FIG. 10 is a perspective view of a fourth embodiment of a hinge in accordance with the present invention.
Figure 11:
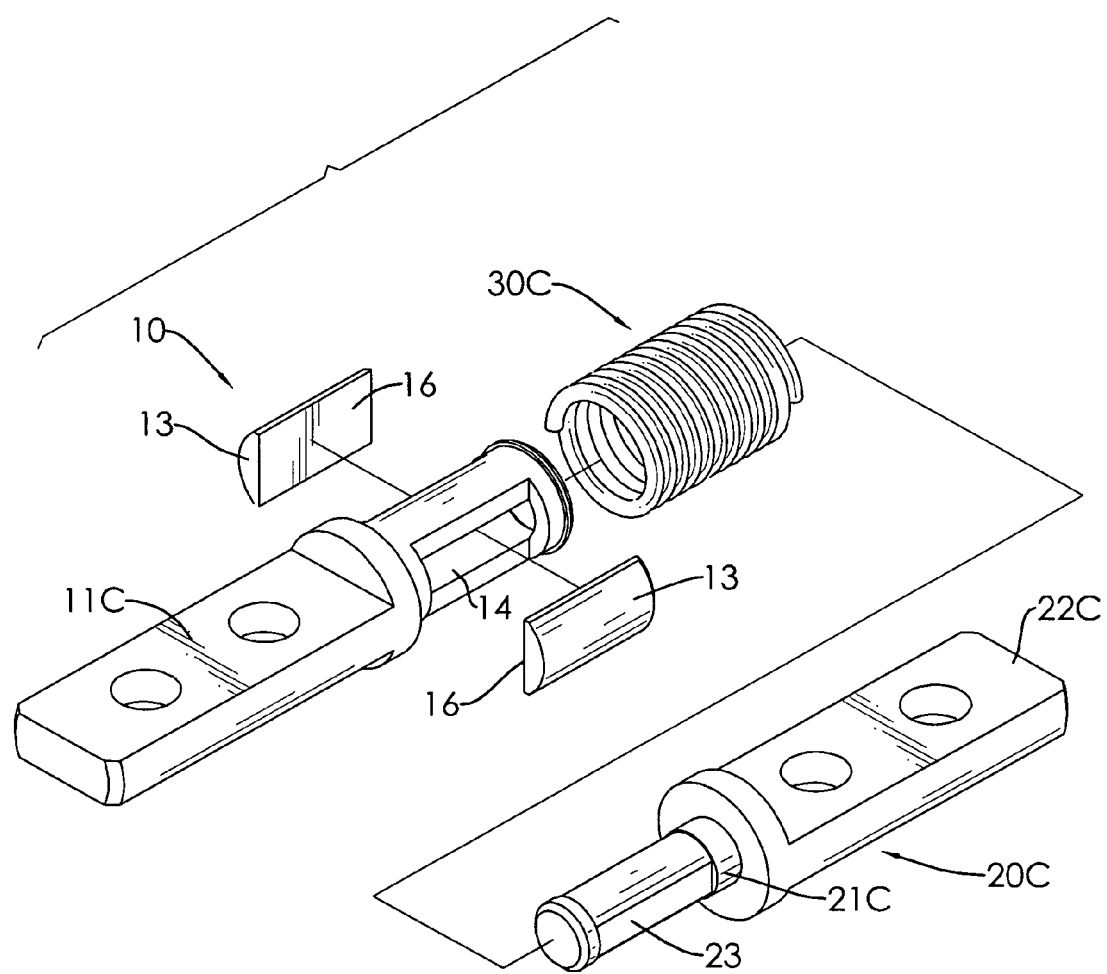
FIG. 11 is an exploded perspective view of the hinge in FIG. 10.
Figure 12:
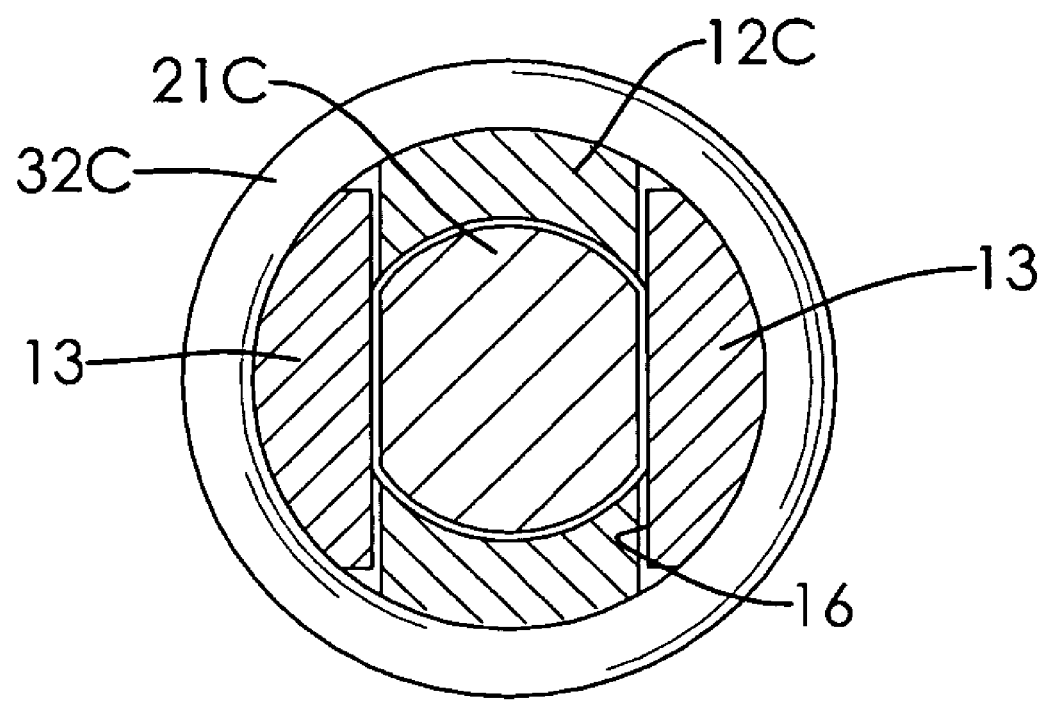
FIG. 12 is an end view in partial section of the hinge in FIG. 10.

With reference to FIGS. 5 and 8, in some preferred embodiments, the resilient unit (30A, 30B) is a resilient sleeve.

Figure 19:
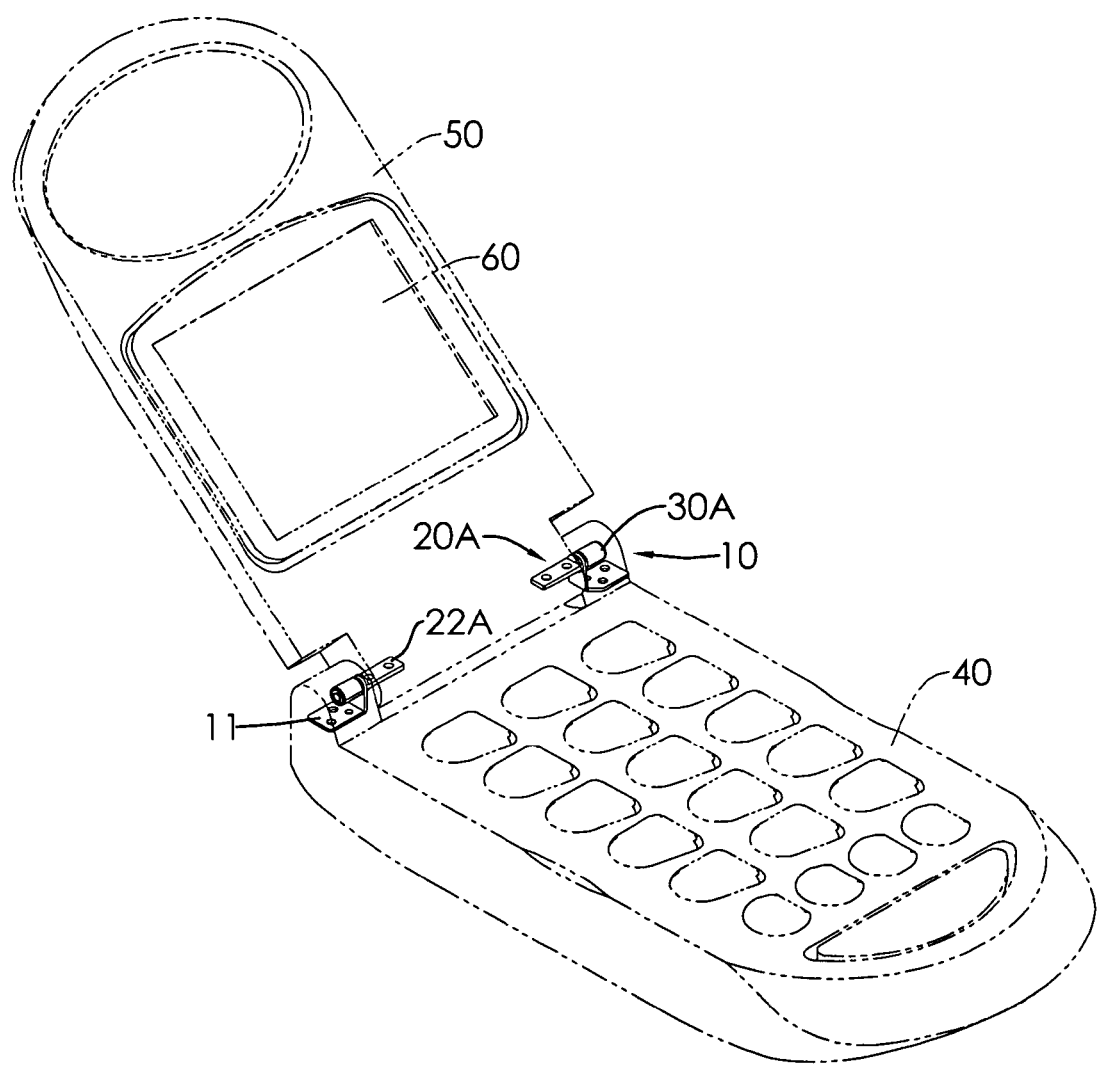
FIG. 19 is a perspective view of an electronic device in accordance with the present invention.

With reference to FIGS. 5 and 19, an electronic device in accordance with the present invention comprises a base (40), a cover (50) with a screen (60) and two hinges as described. The first pivoting assemblies (10) are connected to the base (40). The second pivoting assemblies (20A) are connected to the cover (50).

When the cover (50) is pivoted, the pintle (21A) is rotated. Since the positioning section (23) of the pintle (21A) abuts and wedges the positioning surface (16) of the resilient plug (13), the rotating pintle (21A) pushes the resilient plug (13) outward. Then the resilient plug (13) is tightly pressed on the resilient unit (30) to generate friction. Therefore, the friction between the first and second pivoting assemblies (10, 20A) holds the cover (50) to stop as any desired visual angle.

The amount of the friction is adjustable by the cooperation between the resilient plug (13) and the resilient unit (30). For example, changing a different resilient plug (13) or resilient unit (30) having different resilience could result in different friction. The resilient plugs (13) with different thickness could also result in different friction. Therefore, less preciseness in size of other component is required so reducing the manufacturing costs. Additionally, the resilient plug (13) wedged between the pintle (21) and exposed to the longitudinal cavity (14) keeps the pintle (21) from departing from the sleeve (12).

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge comprising:
   a first pivoting assembly having
      a connecting bracket;
      a sleeve connected to the connecting bracket and having
         a longitudinal cavity; and
         a mounting recess formed in a sidewall of the sleeve and communicating with the longitudinal cavity; and
      a resilient plug mounted tightly in the mounting recess and having a positioning surface exposed to the longitudinal cavity;
   a second pivoting assembly connected to the sleeve and having
      a pintle mounted in the longitudinal cavity of the sleeve and having a positioning section formed on a sidewall of the pintle and abutting and wedging the positioning surface of the resilient plug; and
      a mounting bracket connected to an end of the pintle; and
   a resilient unit mounted around the sleeve and holding the resilient plug.

2. The hinge as claimed in claim 1, wherein the resilient unit is a spring.

3. The hinge as claimed in claim 2, wherein the connecting bracket is formed integrally with the sleeve.

4. The hinge as claimed in claim 1, wherein the resilient unit is a resilient sleeve.

5. The hinge as claimed in claim 4, wherein the connecting bracket is formed integrally with the sleeve.

6. The hinge as claimed in claim 1, wherein the connecting bracket is formed integrally with the sleeve.

7. An electronic device with two hinges claimed in claim 1 comprising:
   a cover with a screen connected to the second pivoting assemblies of the hinges; and
   a base connected to the first pivoting assemblies of the hinges.

8. The electronic device as claimed in claim 7, wherein the resilient unit is a spring.

9. The electronic device as claimed in claim 8, wherein the connecting bracket is formed integrally with the sleeve.

10. The electronic device as claimed in claim 7, wherein the resilient unit is a resilient sleeve.

11. The electronic device as claimed in claim 10, wherein the connecting bracket is formed integrally with the sleeve.

12. The electronic device as claimed in claim 7, wherein the connecting bracket is formed integrally with the sleeve.

* * * * *